United States Patent
Raychinov

(12) 
(10) Patent No.: US 6,539,711 B1
(45) Date of Patent: Apr. 1, 2003

(54) INTEGRAL MULTIFUNCTIONAL SYSTEM FOR MOTOR VEHICLE

(76) Inventor: Galin Stefanov Raychinov, 47 Detelin viovoda str., Apt. 3, Sofia 1505 (BG)

(*) Notice: Subject to any disclaimer, the term of this patent is extended or adjusted under 35 U.S.C. 154(b) by 0 days.

(21) Appl. No.: 09/869,417
(22) PCT Filed: Jan. 11, 2000
(86) PCT No.: PCT/BG00/00001
§ 371 (c)(1), (2), (4) Date: Jun. 27, 2001
(87) PCT Pub. No.: WO00/43652
PCT Pub. Date: Jul. 27, 2000

(30) Foreign Application Priority Data

Jan. 20, 1999 (BG) .............................. 103104

(51) Int. Cl.⁷ ............................................. F02B 41/10
(52) U.S. Cl. ......................... 60/413; 60/39.01; 60/597
(58) Field of Search ................. 60/39.01, 396, 60/597, 598, 413, 414, 418

(56) References Cited

U.S. PATENT DOCUMENTS 4,348,863 A * 9/1982 Taylor et al. ................. 60/413
5,329,770 A 7/1994 Ward ........................... 60/597

FOREIGN PATENT DOCUMENTS

EP 0 366 536 A 5/1990
GB 2 062 112 A 5/1981

* cited by examiner

Primary Examiner—Edward K. Look
Assistant Examiner—Thomas E. Lazo
(74) Attorney, Agent, or Firm—Michael A Mann; Nexsen Pruet Jacobs & Pollard LLC

(57) ABSTRACT

In a motor vehicle provided with an internal combustion engines and at least one auxiliary hydraulic mechanism, a system is provided that integrates pressurizing hydraulic fluid for the auxiliary hydraulic mechanism using of heat energy from the engine exhaust gases, and using the inertial energy from the voluntary slowing of the speed of the engine, as well as assisting in the starting system of the engine. The system includes a gas turbine (1), hydraulic pump (2), hydraulic accumulator (3), microcomputer (10), a hydraulic machined(11), a mechanical transmission (12), a tank (13) and piping, sensors and valves. A hydraulic transmission is positioned between the gas turbine (1) and the hydraulic accumulator (3), and a reverse hydraulic transmission is positioned between the shaft of the engine (15) and the hydraulic accumulator (3), so that the auxiliary hydraulic mechanism (14) can be fed with hydraulic liquid under pressure from the hydraulic accumulator (3). These components so arranged provide a permanent supply of pressurized hydraulic fluid to the auxiliary hydraulic mechanism when it operates in a pumping mode.

12 Claims, 2 Drawing Sheets

INTEGRAL MULTIFUNCTIONAL SYSTEM FOR MOTOR VEHICLE

TECHNICAL FIELD

The present invention relates to an integral multifunctional system for motor vehicles, more specifically for those equipped with internal combustion engines and at least one auxiliary hydraulic mechanism and is applicable predominantly in the construction of passenger cars and lorries as well as buses.

Prior Art

Unknown is a system which similarly to the system of the present invention can perform simultaneously the following functions: utilisation of the energy of the exhaust gases, utilisation of the inertia energy when the driver voluntarily slows down the speed of the vehicle and/or its engine, supply of hydraulic liquid under pressure to auxiliary hydraulic mechanism(s) and collecting the liquid by the latter, as well as assisting the work of the starting system of the engine.

The following is known about the individual functions of the invention:

Turbo compound systems for internal combustion engines where the energy of the exhaust gases is utilized by a turbine which transforms the heat energy into mechanical energy and transfers it through a transmission as additional power to the engine shaft (U.S. Pat. No. 2,585,968, U.S. Pat. No. 4,586,337, U.S. Pat. No. 4,832,311 and U.S. Pat. No. 4,882,906). The basic problems facing the turbo compound systems are the big differences in the frequency of changing the momentary angular velocities and the momentary torque of the turbine and of the engine shaft and the fact that a high efficiency of the gas turbine is achieved at a relatively higher speed of rotation which, besides this, does not maintain a permanent relation with the speed of rotation of the engine shaft in different regimes of operation of the latter. The solution of these problems in some of the known turbo compound systems through a mechanical transmission with big and alternate transmission ratio and hydrodynamic clutch for clearing off the differences in the frequency of changing the momentary angular velocities (U.S. Pat. No. 2,585,968, U.S. Pat. No. 4,586,337, U.S. Pat. No. 4,832,311 and U.S. Pat. No. 4,882,906) lead to shortcomings such as to large volume, weight, complexity and price of the systems and low efficiency coefficient, and in one of the known systems (U.S. Pat. No. 4,832,311) additional shortcoming is the presence of voluminous, complex and unreliable regulated exhaust system of the engine.

Known from U.S. Pat. No. 4,805,409 and U.S. Pat. No. 4,894,992 are also turbo compound systems with electric transmission. Their shortcomings are the big weight and volume and low efficiency coefficient, as well as the complex and expensive devices for regulation of the speed of rotation of the electric engine and its coordination with the speed of rotation of the internal combustion engine.

Known is a turbo compound system (U.S. Pat. No. 5,079,913) with a combined mechanical and electric transmission. It combines the basic shortcomings of the systems with mechanical and systems with electric transmission.

Known are hydraulic systems which provide supply of hydraulic liquid under pressure to auxiliary hydraulic mechanism(s), most frequently a hydraulic booster of the steering system of the vehicle and collection of the liquid by it (them) (U.S. Pat. No. 5,505,276 and U.S. Pat. No. 5,749,431). They consist of a mechanical transmission through which a hydraulic pump is constantly operated by the engine and a hydraulic liquid tank. The shortcomings of such systems are: increased fuel consumption and respectively harmful emissions of the vehicle due to the permanent driving of the pump by the engine, including during most of the time when the auxiliary hydraulic mechanism is not in operation, as well as the circumstance that during the time in question the whole system represents a weight and volume ballast in which certain resources have been invested, but it is not used for useful functions.

Known is a regenerating brake system for vehicle (U.S. Pat. No. 5,050,936) consisting of distribution box located between the gear box and the main transmission of the vehicle connected through at least one electromagnetic clutch with a hydraulic machine which is connected with two hydraulic tanks for low and high pressure, valves, a multitude of sensors for the operative regimes of the engine and the basic brake system of the vehicle, as well as for the location of the brake pedal and a computer connected with the sensors, the valves for the hydraulic machine and the electromagnetic clutch(s). In regime of voluntary slowing down the speed of the vehicle by the driver the computer activates the electromagnetic clutch(s) and the hydraulic machine switches into a pump regime, whereas it operates as a brake which accumulates in the hydraulic tank for high pressure this part of the inertia energy of slowing down which has been transmitted to it. In subsequent acceleration of the vehicle the hydraulic machine switches on as an engine with a liquid from the hydraulic tank for high pressure and utilizes the accumulated energy by transmitting an additional torque to the outlet shaft of the transmission box of the vehicle. In uniform motion the electromagnetic clutch(s) switch out thereby disconnecting the mechanical connection between the transmission of the vehicle and the hydraulic machine. This system has several basic shortcomings. Due to the fact that the system is connected to the transmission of the vehicle after the transmission box, the system operates at low rotation speed and high torque which presupposes big weight and volume of its mechanical and hydraulic units. Besides, the system is complex, with a multitude of units but it fulfils no other functions. As a result, the weight, the volume and the price of the system and its maintenance are too high in comparison with the only function it performs during a relatively small part of the time of operation of the vehicle;

Systems for assisting the operation of the starting system of the engine at the time of its starting are not known.

SUMMARY

The aim of the invention is to create an integral multifunctional system which can reduce the fuel consumption and respectively the harmful emissions of the vehicle provided with internal combustion engine through utilisation of the energy of the exhaust gases of the engine and the inertia energy when the driver voluntarily slows down the speed of the vehicle and/or its engine, simultaneously providing supply of hydraulic liquid under pressure to auxiliary hydraulic mechanisms of the vehicle and collection of the liquid by them, as well as to assist the operation of the starting system of the engine, providing at the same time a maximal simplicity and minimal volume, weight and price of the system through integrated multifunctional using of the prevailing part of its units.

The solution, according to the invention, is found by integral multifunctional system for motor vehicle provided with internal combustion engine and with at least one auxiliary hydraulic mechanism, where the system includes a tank for liquid connected with the outlet of the auxiliary hydraulic mechanism. Characteristic of the system is the fact that it consists of a hydraulic accumulator which, through electrically operated valve, is connected with the inlet of a hydraulic machine whose shaft is connected through a mechanical transmission with the engine shaft of the vehicle, and through a non-return valve the hydraulic accumulator is connected with the outlet of the hydraulic machine, and the hydraulic accumulator is also connected with the inlet of the auxiliary hydraulic mechanism(s). The outlet of the hydraulic machine, through another electrically operated valve, is connected with a hydraulic liquid tank which is also connected with the inlet of the hydraulic machine through a non-return valve, whereas the two electrically operated valves are connected electrically with a microcomputer which is also connected with a sensor for pressure and/or quantity of liquid hydraulically connected with the hydraulic accumulator and the microcomputer is connected with at least one sensor for the operative regime of the engine.

In one preferred embodiment the system includes a gas turbine fitted on the exhaust pipe of the engine of the vehicle, wherein the shaft of the gas turbine is mechanically connected with the shaft of a hydraulic pump and the hydraulic liquid tank is also connected with the inlet of the hydraulic pump whose outlet is connected with the hydraulic accumulator.

Suitable for this variant is for the shaft of the gas turbine to be connected with the shaft of the hydraulic pump through a mechanical transmission with reducing transmission ratio.

It is expedient, in these two variants, to provide between the hydraulic pump and the hydraulic accumulator a sensor for movement of the hydraulic liquid which is connected with the microcomputer.

In combination with the basic embodiment and/or with each of the above variants it is suitable to provide the hydraulic machine and/or the hydraulic pump with electrically operated mechanisms for regulation of the volume capacity, which mechanisms are electrically connected with the microcomputer.

Provided in combination with each of the above variants can be, between the inlet and the outlet of the gas turbine, a by-pass pipe for exhaust gases where a by-pass valve can be fitted.

With these variants the by-pass valve can have an electric operated opening mechanism, which mechanism must be connected electrically with the microcomputer which is also connected with two additional sensors for pressure of exhaust gases before and after the gas turbine.

The solution was also found by an integral multifunctional system for motor vehicle provided with an internal combustion engine, at least one auxiliary hydraulic mechanism and a microcomputer system for control of the operation of the engine consisting of at least one microcomputer connected with at least one sensor for the operative regime of the engine, where the integral multifunctional system includes a hydraulic liquid tank connected with the outlet of the auxiliary hydraulic mechanism and it is characterized by including a hydraulic accumulator which is connected, through an electrically operated valve, with the inlet of a hydraulic machine whose shaft is connected through a mechanical transmission with the shaft of the engine of the vehicle, and through a non-return valve the hydraulic accumulator is also connected with the outlet of the hydraulic machine, as the hydraulic accumulator is also connected with the inlet of the auxiliary hydraulic mechanism(s) and the outlet of the hydraulic machine, through another electrically operated valve is connected with the hydraulic liquid tank which is also connected with the inlet of the hydraulic machine through a non-return valve. The two electrically operated valves are connected electrically with the microcomputer which is also connected with a sensor for pressure and/or quantity of liquid, connected hydraulically with the hydraulic accumulator.

One of the variants of the integral multifunctional system includes a gas turbine fitted on the exhaust pipe of the engine of the vehicle, as the shaft of the gas turbine is mechanically connected with the shaft of a hydraulic pump and the hydraulic liquid tank is also connected with the inlet of the hydraulic pump whose outlet is connected with the hydraulic accumulator.

Suitable for this variant is for the shaft of the gas turbine to be connected with the shaft of the hydraulic pump through a mechanical transmission with reducing transmission ratio.

Possible, in combination with one of the above preferred variants, is the inclusion between the hydraulic pump and the hydraulic accumulator of a sensor for movement of the hydraulic liquid connected with the microcomputer.

Other preferred variants can be obtained through a combination of the characteristics of the basic variant and/or of the above preferred variants by a solution characterized by the fact that the hydraulic machine and/or the hydraulic pump are provided with electrically operated mechanisms for regulation of the volume capacity, which mechanisms are electrically connected with the microcomputer.

Other preferred embodiments of the system are characterized by the fact that between the inlet and the outlet of the gas turbine there is a by-pass pipe for exhaust gases where a by-pass valve is fitted.

Expedient with these variants is for the by-pass valve to have an electrically operated opening mechanism, which mechanism is electrically connected with the microcomputer, connected with whom are two additional sensors for pressure of the exhaust gases before and after the gas turbine.

The advantages of the system according to the invention are expressed in the following:

By virtue of the connections between the units of the system it provides a permanent supply to the auxiliary hydraulic mechanism(s) of hydraulic liquid under pressure from the hydraulic accumulator which is charged by the hydraulic pump and/or by the hydraulic machine when it operates in a pumping regime. The system also provides utilization of the energy of the exhaust gases through the gas turbine and the hydraulic transmission performed by the hydraulic pump, the hydraulic accumulator and the hydraulic machine when the latter operates in an engine regime, as a result from the opening of the electrically operated valves by the microcomputer. When the driver voluntarily slows down the speed of the vehicle and/or its engine the system also provides accumulation of a part of the inertia energy through the hydraulic machine operating in pumping regime and hydraulic accumulator and using the accumulated energy in subsequent acceleration of the vehicle through the hydraulic machine operating as an engine with a liquid from the hydraulic accumulator, as a result of opening the electrically operated valves by the microcomputer.

The system also provides the support of the starting system of the engine through the respective activation of the hydraulic machine as an engine in starting the engine in the presence of pressure and/or liquid in the hydraulic accumulator. In operating the system for utilization of the energy of the exhaust gases the hydraulic accumulator has two applications: as a damper which solves the problem of clearing off the difference in the frequency of changing the momentary angular velocities of the gas turbine and of the engine shaft; and as a tank for hydraulic liquid under pressure which solves, in certain periods of time, the problem of the necessity of inconstant transmission ratio between the gas turbine and the engine. The very transmission ratio is provided by the different volume capacities of the hydraulic pump and the hydraulic machine. In the variants of embodiment in which the volume capacity of the hydraulic machine and/or the hydraulic pump is regulated the problems related to the transmission ratio and its inconstant value are solved more precisely through respective regulation of the volume capacities by the microcomputer in the process of operation of the system.

The basic and principal advantage of the system according to the invention is its multifunctional nature. It performs the functions of all types of systems discussed above in the prior art section, having volume, weight, complexity and price comparable an even less than only one system of the discussed types. Besides, it also provides support to the starting system of the engine.

The system according to the invention has also advantages in comparison with each of the discussed systems individually as follows:

In comparison with the known turbo compound systems:

higher efficiency in utilizing the energy of the exhaust gases;

lesser weight, volume and price.

In comparison with the known hydraulic systems for feeding auxiliary hydraulic mechanisms of motor vehicles the advantages are that all units of the system are constantly engaged in useful functioning regardless of whether the auxiliary hydraulic mechanism operates at a certain moment, as well as the circumstance that it consumes power from the engine not constantly but only in rare and short periods of time.

In comparison with the known regenerating braking system the advantages are the simplified construction the reduced volume, weight and price, as well as the circumstance that during the time when the system does not operate as a regenerating braking system it performs other useful functions.

PREFERRED EMBODIMENT

Figure 1:
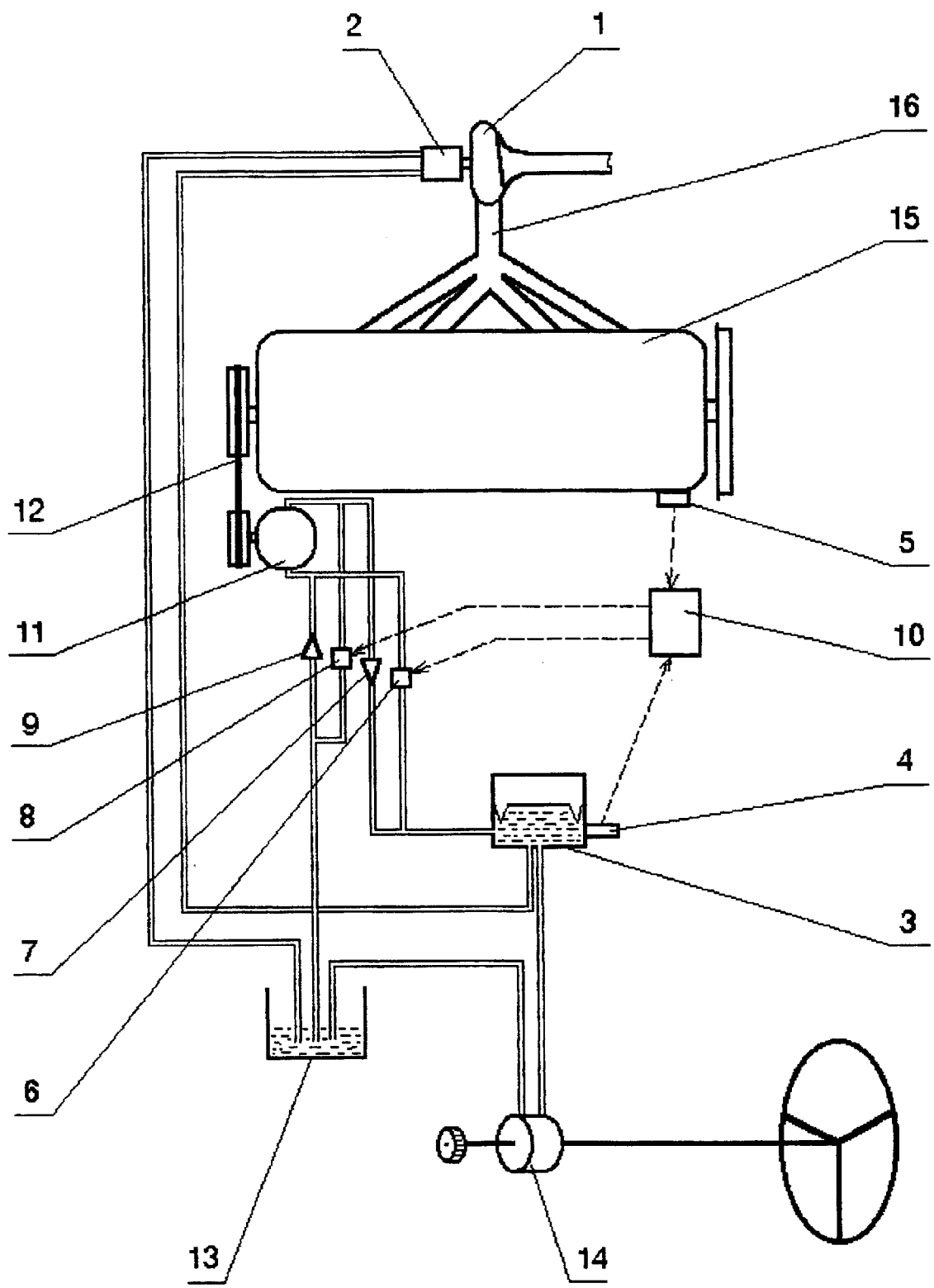
FIG. 1 represents a block diagram of the system according to the invention in its variant together with the engine of the vehicle and with an exemplary auxiliary hydraulic mechanism of the latter, namely a hydraulic booster of the steering system.

It can be seen in FIG. 1 that the system consists of gas turbine 1, hydraulic pump 2 of a type not allowing back feeding of the liquid into the pump 2 from its outlet to the inlet and exceeding of a predetermined pressure of the injected liquid, hydraulic accumulator 3, sensor 4 for the pressure and/or the quantity of liquid in the hydraulic accumulator, sensor(s) 5 for the regime of operation of the engine, electrically operated valves 6 and 8, non-return valves 7 and 9, microcomputer 10 for control of the electrically operated valves, hydraulic machine 11, jagged-belt gear 12, tank 13 for hydraulic liquid and respective pipes.

The gas turbine 1 is fitted on the exhaust pipe 16 of the internal combustion engine 15. The shaft of the gas turbine 1 is connected with the shaft of the hydraulic pump 2 whose inlet through the respective pipe is connected with the tank 13 and its outlet, through the respective pipe, is connected with the hydraulic accumulator 3. Connected with the hydraulic accumulator 3 is the sensor 4 and a pipe for feeding the inlet of the hydraulic booster 14 of the steering system of the vehicle. The hydraulic accumulator 3, through the respective pipes, is connected through the non-return valve 7 with the outlet of the hydraulic machine 11, as the non-return valve 7 is so oriented that the only possible movement of the liquid is from the outlet of the hydraulic machine to the hydraulic accumulator. The inlet of the hydraulic machine through respective pipes and through the electrically operated valve 6 is again connected with the hydraulic accumulator 3. The inlet and the outlet of the hydraulic machine 11, through respective pipes, are also connected with the tank 13, respectively through the non-return valve 9 and through the electrically operated valve 8, as the non-return valve 9 is so oriented as movement of the liquid is only possible from the tank to the inlet of the hydraulic machine. The shaft of the hydraulic machine 11, through the jagged-belt gear 12 is connected with the shaft of the engine 15 of the vehicle (not shown in the figure). The electrically operated valves 6 and 8 are electrically connected respectively with two control outputs of the microcomputer 10, whose signal inputs are electrically connected with the sensor 4 and the sensor(s) 5 for the regime of the engine. Connected with the tank 13, through a respective pipe, is the outlet of the hydraulic booster 14.

The system operates as follows:

In operating the internal combustion engine 15 its exhaust gases rotate the gas turbine 1 and on its part it operates the hydraulic pump 2. By doing this the hydraulic pump sucks in hydraulic liquid from the tank 13 and injects it into the hydraulic accumulator 3. Simultaneously, and because the electrically operated valves 6 and 8 are closed the hydraulic machine 11 draws in through the non-return valve 9 liquid from the tank 13 and injects it through the non-return valve 7 into the hydraulic accumulator 3. When the pressure and/or the quantity of the liquid in the latter reaches a predetermined value the sensor 4 transmits a respective signal to the microcomputer 10 which, as a result of data and programs entered preliminary into it, opens the electrically operated valves 6 and 8, providing a hydraulic connection between the inlet of the hydraulic machine 11 through the valve 6 with the hydraulic accumulator 3, as well as a hydraulic connection between the outlet of the hydraulic machine 11 through the valve 8 with the tank 13. Whereas the non-return valve 9 does not allow movement of the liquid under pressure from the hydraulic accumulator 3 through the inlet of the hydraulic machine 11 to the tank 13 and the non-return valve 7 does not allow movement of the liquid under pressure from the hydraulic accumulator 3 through the outlet of the hydraulic machine 11 to the tank 13. Then the hydraulic machine 11, as a result of liquid under pressure fed to its inlet by the hydraulic accumulator 3 starts to operate as an engine and through the jagged-belt gear 12 transmits an additional torque to the shaft of the engine 15.

The exhaust liquid from the hydraulic machine 11, through the electrically operated valve 8, is collected in the tank 13. Simultaneously, the hydraulic accumulator 3, through the respective pipe, where necessary, feeds the hydraulic booster 14 of the steering system of the vehicle.

If the flow rate of the liquid from the pump 2 becomes lesser than the flow rate consumed by the hydraulic machine 11 operating as a motor and eventually the hydraulic booster 14, then the hydraulic accumulator 3 begins to empty and the pressure and/or the quantity of the liquid in it begins to lessen with the release of the spring element. And when they drop to a predetermined value the sensor 4 transmits a respective signal to the microcomputer 10 which, as a result of data and programs preliminary entered into it, closes the electrically operated valves 6 and 8 which disconnects the hydraulic connections between the hydraulic accumulator 3 and the inlet of the hydraulic machine 11 and between the outlet of the hydraulic machine 11 and the tank 13. Then the hydraulic machine starts to operate as a pump which, through the jagged-belt gear 12 is operated by the shaft of the engine 15 and injects liquid from the tank 13 into the hydraulic accumulator 3 for its feeding with liquid and eventually feeding the hydraulic booster 14. Whereas, the pump 2 continues to inject liquid from the tank 13 to the hydraulic accumulator 3 in parallel with the hydraulic machine 11, so that the energy of the exhaust gases accumulates for subsequent moments of use.

When the speed of the vehicle is voluntarily slowed down by the driver, through the braking effect of the engine and/or voluntary slowing down of the engine the microcomputer 10 receives the respective signals from the sensor(s) 5 for the regime of the engine and from the sensor 4 for the pressure and/or quantity of the liquid. Then the microcomputer 10, as a result of data and programs preliminary entered into it, closes the valves 6 and 8 if the pressure and/or the quantity of liquid in the hydraulic accumulator 3 is not critically high. As a result, the hydraulic machine 11 starts to operate as a pump operated by the slowing down engine 15 through the gear 12 and injects hydraulic liquid from the tank 13 into the hydraulic accumulator 3 whereas the pressure and/or the quantity of liquid in it can be increased above the value at which the microcomputer switches the hydraulic machine into operation as an engine when there is no slowing down of the engine of the vehicle, including due to slowing down of the speed of the vehicle itself. Thus, a definite part of the inertia energy in slowing down the speed of the vehicle and/or the engine is accumulated as a definite quantity of hydraulic liquid under pressure in the hydraulic accumulator. If the process of slowing down continues after the pressure and/or the quantity of liquid in the hydraulic accumulator 3 reaches critically high level the sensor 4 transmits the respective signal to the microcomputer 10 which opens the valve 8 and the liquid begins to circulate from the outlet to the inlet of the hydraulic machine 11 through the valve 8 and the non-return valve 9. As soon as the regime of slowing down stops and the engine 15 passes to a regime of engine operation the sensor(s) 5 transmit the respective signal(s) to the microcomputer 10. Then, if the signal from the sensor 4 indicates pressure and/or quantity of liquid above the minimum maintained in the hydraulic accumulator the microcomputer, as a result of data and programs preliminary entered into it, opens the valves 6 and 8. As a result the hydraulic machine 11 starts to operate as an engine which, through the gear 12, transfers additional torque to the shaft of the engine 15 thus utilizing the energy accumulated at the time of the slowing down.

Figure 2:
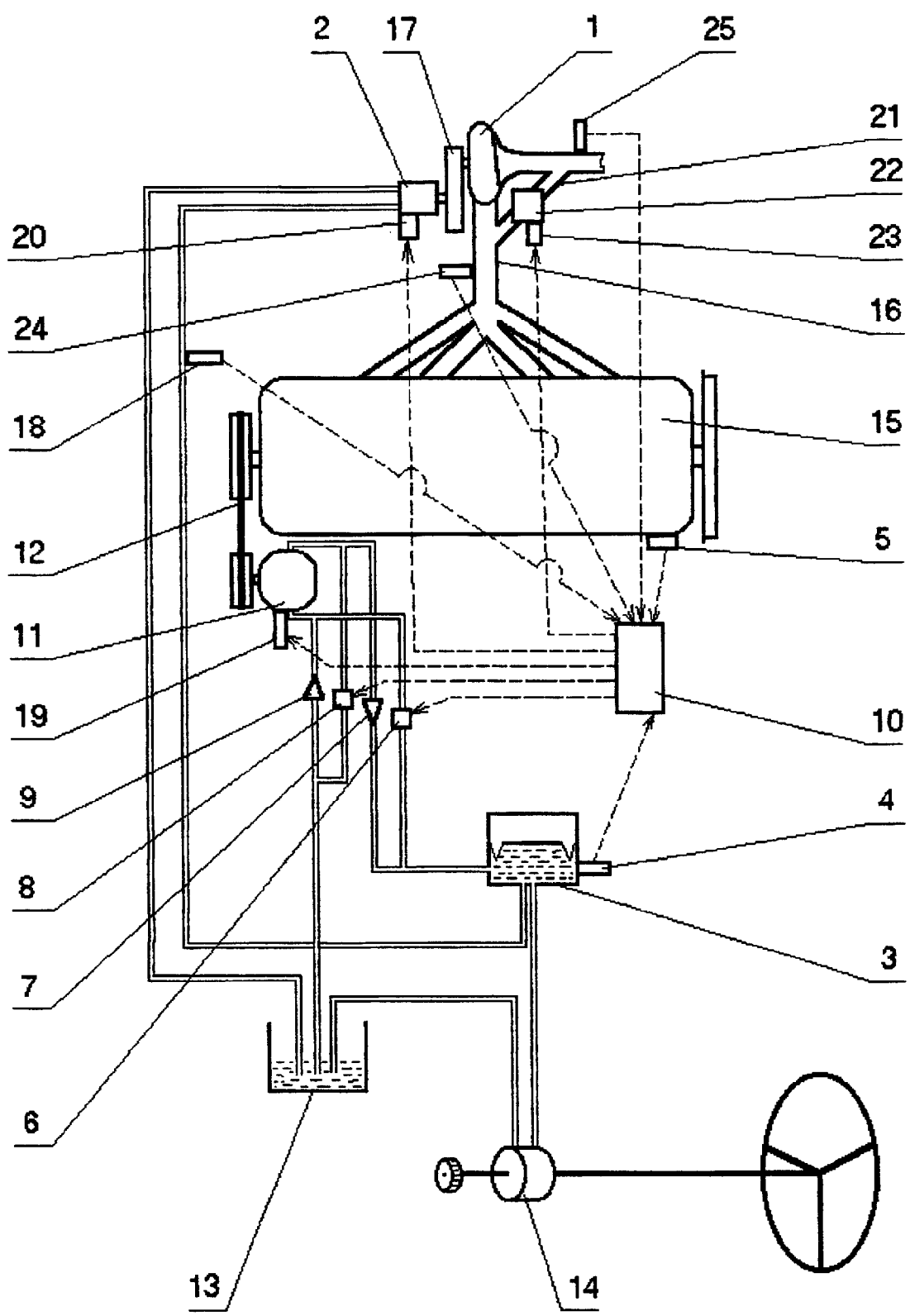
FIG. 2 represents a block diagram of the system according to the invention in its variant, together with all additional units provided for in the additional variants, and together with the engine of the vehicle and one exemplary auxiliary hydraulic mechanism of the latter, namely hydraulic booster of the steering system.

When simultaneously the flow of the exhaust gases does not provide injection of hydraulic liquid from the hydraulic pump 2 into the hydraulic accumulator 3 and the vehicle and/or its engine do not operate in a regime of slowing down the system operates as a common system of supplying hydraulic liquid under pressure to the hydraulic booster and drainage of the liquid from the latter. The difference is that two variants of operation are possible. With the first one the hydraulic machine 11 is not idle in any moment. It operates in consecutive cycles as a pump injecting liquid into the hydraulic accumulator and as an engine with hydraulic liquid from the hydraulic accumulator. With the second one, if the system has sensor 18 (FIG. 2) for movement of the liquid between the hydraulic pump 2 and the hydraulic accumulator 3, which sensor indicates lack of movement, or if the system is in its limited variant the microcomputer 10 opens the electrically operated valve 8 and the liquid circulates from the outlet of the hydraulic machine 11 to its inlet through the electrically operated valve 8 and the non-return valve 9. Thus, in any regime of operation of the engine and of the vehicle itself the system admits fluctuation of the pressure and/or the quantity of liquid in the hydraulic accumulator within pre-set limits, however always guaranteeing enough pressure and/or quantity of liquid for the operation of the hydraulic booster 14.

In starting the engine the sensor(s) 5 and the sensor 4 transmit the respective signals to the microcomputer 10. If there is enough pressure and/or quantity of liquid in the hydraulic accumulator 3 the microcomputer 10, as a result of data and programs preliminary entered into it, opens the valves 6 and 8. As a result the hydraulic machine 11 starts to operate as an engine which supports the starting system of the engine. If the pressure and/or the quantity of liquid is insufficient the microcomputer 10 opens only the valve 8, as the liquid circulates from the outlet to the inlet of the hydraulic machine 11 through the valve 8 and the non-return valve 9 without creating additional resistance for the starter of the engine.

In operation of the motor vehicle the above regimes of operation of the system according to the invention are constantly fulfilled consecutively or simultaneously, depending on the specific regimes of operation of the engine, the regimes of consumption of liquid by the auxiliary hydraulic mechanisms, the regimes of movement of the motor vehicle and the data and programs entered into the computer.

Provided in this way is:
utilization of the energy of the exhaust gases of the engine;
utilization of a definite part of the inertia energy in slowing down the vehicle and/or its engine;
permanent feeding of the auxiliary hydraulic mechanisms of the vehicle with hydraulic liquid under pressure;
supporting the starting system of the engine.

There is an incomplete variant of the system without the gas turbine 1 and the hydraulic pump 2. In this variant the system does not perform the function of utilization of the energy of the exhaust gases.

There is a variant of the system (FIG. 2) where between the gas turbine 1 and the hydraulic pump 2 there is a mechanical transmission 17 for reduction of the speed of rotation of the hydraulic pump.

There are variants of the system (FIG. 2) where between the hydraulic pump 2 and the hydraulic accumulator 3 a sensor 18 is fitted for the movement of the hydraulic liquid, connected with the microcomputer 10. There, in case that there is no movement of the liquid from the hydraulic pump 2 to the hydraulic accumulator 3, and at the same time the sensor 4 for the pressure and/or the quantity of liquid in the hydraulic accumulator does not register deviation from the pre-set limits, i.e. The hydraulic accumulator does not need feeding and the sensor(s) 5 for the regime of the engine do not register slowing down, the microcomputer 10 opens the electrically operated valve 8 between the outlet of the hydraulic machine 11 and the tank 13. Then the liquid circulates from the outlet of the hydraulic machine 11 through the electrically operated valve 8 and the non-return valve 9 to the inlet of the hydraulic machine 11, whereas the latter is not charged into a pumping regime and the engine 15 power consumed by it is reduced.

There are variants of the system (FIG. 2) where the hydraulic pump 2 and/or the hydraulic machine 1 have electrically operated mechanisms, respectively 20 and 19, for changing their volume capacities, which mechanisms are connected with the microcomputer 11, the latter operating them in compliance with the regime of operation of the engine 15, the regime of movement of the vehicle and the pressure and/or the quantity of liquid in the hydraulic accumulator 3 on the basis of the data and programs entered into it.

There are variants (FIG. 2) where between the inlet and the outlet of the gas turbine there is a by-pass pipe 21 with a by-pass valve 22 which opens at a set difference between the pressure of the exhaust gases at the inlet and the outlet of the gas turbine, thus not allowing the occurrence of excessive resistance in the exhaust tract of the engine 15.

There is a variant of the preceding variant of the system (FIG. 2) where the by-pass valve 22 in the by-pass pipe 21 has a mechanism 23 for electric operation, connected with the microcomputer 10, where the system has additional sensors 24 and 25 for the pressure of the exhaust gases at the inlet and the outlet of the gas turbine, which sensors are also connected with the microcomputer 10. Then the opening and/or the flow rate of the by-pass valve 22 is operated by the microcomputer 10 on the basis of respectively entered data and programmers, on the basis of the difference in the pressure of the gases, the pressure and/or the quantity of liquid in the hydraulic accumulator 3 and the regimes of operation of the engine 15 and of the movement of the vehicle.

It is obvious from the above to those skilled in the art that there is a possibility of a multitude of other modifications and variants of combination of the elements of the system. For this reason the scope of protection, determined in the claims, must in no case be limited to the preferred embodiments which serve only as an illustration and explain the essence of the invention.

What is claimed is:

1. Integral multifunctional system for motor vehicle, the system comprising;
   an internal combustion engine (15),
   a tank (13) for hydraulic liquid,
   a hydraulic accumulator (3),
   a hydraulic pump/motor (11),
   at least one auxiliary hydraulic actuating mechanism (14),
   a microcomputer (10),
   two electrically operated valves (6,8) and two non-return valves (7,9),
   a first sensor (4) for monitoring pressure and/or quantity of liquid of the hydraulic accumulator and,
   at least one second sensor (5) for monitoring engine parameters the above items been connected as follows:
   the shaft of the hydraulic pump/motor (11) is mechanically connected via a transmission (12) to the shaft of the internal combustion engine (15),
   the tank (13) is connected to the inlet of the hydraulic pump/motor (11) via a first non-return valve (9), allowing fluid to pass from the tank (13) to the hydraulic pump/motor (11),
   the outlet of the hydraulic pump/motor (11) is connected to the tank (13) via a first electrically operated valve (8),
   the outlet of the hydraulic pump/motor (11) is also connected to the hydraulic accumulator (3) via a second non-return valve (7), allowing fluid to pass the hydraulic pump/motor (11) to the accumulator (3),
   the hydraulic accumulator (3) is connected to the inlet of the hydraulic pump/motor (11) via a second electrically operated valve (6),
   the hydraulic accumulator (3) is also connected to the inlet of the auxiliary hydraulic actuating mechanism (14),
   the outlet of the auxiliary hydraulic actuating mechanism (14) is also connected to the tank (13),
   the microcomputer (10) is electrically connected to the two electrically operated valves (6,8),
   the microcomputer (10) also being electrically connected with the first sensor (4), hydraulically in contact with the hydraulic accumulator (3),
   the microcomputer (10) also being electrically connected with the at least one second sensor (5), which is fitted on the engine (15).

2. Integral multifunctional system according to claim 1, characterized by including a gas turbine (1) fitted on an exhaust pipe (16) of the engine (15) of the vehicle, as the shaft of the gas turbine (1) is mechanically connected with the shaft of a hydraulic pump (2) and the tank (13) for hydraulic liquid is also connected with the inlet of the hydraulic pump (2) whose outlet is connected with the hydraulic accumulator (3).

3. Integral multifunctional system according to claim 2, characterized by the fact that between the hydraulic pump (2) and the hydraulic accumulator (3) is fitted a sensor (18) for movement of the hydraulic liquid, which is connected with the microcomputer (10).

4. Integral multifunctional system according to claim 3, characterized by the fact that the hydraulic machine (11) and/or the hydraulic pump (2) have electrically operated mechanisms for regulation of the volume capacity, which mechanisms are electrically connected with the microcomputer (10).

5. Integral multifunctional system according to claim 2, characterized by the fact that the hydraulic machine (11) and/or the hydraulic pump (2) have electrically operated mechanisms for regulation of the volume capacity, which mechanisms are electrically connected with the microcomputer (10).

6. Integral multifunctional system according to claim 2 characterized by the fact that the shaft of the gas turbine (1) is connected with the shaft of the hydraulic pump (2) through a mechanical transmission (17) with reducing transmission ratio.

7. Integral multifunctional system according to claim 6, characterized by the fact that between the hydraulic pump (2) and the hydraulic accumulator (3) is fitted a sensor (18) for movement of the hydraulic liquid, which is connected with the microcomputer (10).

8. Integral multifunctional system according to claim 7, characterized by the fact that the hydraulic machine (11)

and/or the hydraulic pump (2) have electrically operated mechanisms for regulation of the volume capacity, which mechanisms are electrically connected with the microcomputer (10).

9. Integral multifunctional system according to claim 6, characterized by the fact that the hydraulic machine (11) and/or the hydraulic pump (2) have electrically operated mechanisms for regulation of the volume capacity, which mechanisms arc electrically connected with the microcomputer (10).

10. Integral multifunctional system according to claim 1, characterized by the fact that the hydraulic machine (11) and/or the hydraulic pump (2) have electrically operated mechanisms for regulation of the volume capacity, which mechanisms are electrically connected with the microcomputer (10).

11. Integral multifunctional system according to claims 2,3,4,5,6,7,8,9 or 10, characterized by the fact that between the inlet and the outlet of the gas turbine (1) there is a by-pass pipe (21) for the exhaust gases with a fitted by-pass valve (22).

12. Integral multifunctional system according to claim 11, characterized by the fact that the by-pass valve (22) is provided with an electrically operated opening mechanism (23), which mechanism is electrically connected with the microcomputer (10), with whom two additional sensor are connected, respectively (24) and (25) for pressure of the exhaust gases before and after the gas turbine.

* * * * *